United States Patent
Wei

(10) Patent No.: US 7,817,316 B2
(45) Date of Patent: Oct. 19, 2010

(54) SCANNING APPARATUS FOR TRANSPARENT DOCUMENTS

(76) Inventor: Chih-Hsien Wei, 9F., No. 378, Sec. 1, Keelung Rd., Sinyi District, Taipei City (TW)

(*) Notice: Subject to any disclaimer, the term of this patent is extended or adjusted under 35 U.S.C. 154(b) by 1475 days.

(21) Appl. No.: 11/197,406

(22) Filed: Aug. 5, 2005

(65) Prior Publication Data

US 2006/0203304 A1 Sep. 14, 2006

(30) Foreign Application Priority Data

Mar. 11, 2005 (TW) .............................. 94107563 A

(51) Int. Cl.
*H04N 1/04* (2006.01)
*G03F 3/10* (2006.01)
*H04N 1/43* (2006.01)

(52) U.S. Cl. ..................... 358/506; 358/487; 358/497; 358/475; 358/527; 358/509

(58) Field of Classification Search ................ 358/474, 358/475, 487; 382/312
See application file for complete search history.

(56) References Cited

U.S. PATENT DOCUMENTS

| | | | | |
|---|---|---|---|---|
| 5,781,311 | A * | 7/1998 | Inoue et al. | 358/475 |
| 6,169,611 | B1 * | 1/2001 | Brook et al. | 358/487 |
| 6,185,011 | B1 * | 2/2001 | William | 358/474 |
| 6,553,154 | B1 * | 4/2003 | Cheng | 382/312 |
| 6,614,563 | B1 * | 9/2003 | Batten et al. | 358/487 |
| 6,831,759 | B1 | 12/2004 | Witte et al. | |
| 6,989,918 | B2 * | 1/2006 | Haas et al. | 358/487 |
| 7,310,172 | B2 * | 12/2007 | Dowdy et al. | 358/487 |
| 7,408,685 | B2 * | 8/2008 | Noguchi et al. | 358/487 |
| 7,433,092 | B2 | 10/2008 | Spears et al. | |

(Continued)

FOREIGN PATENT DOCUMENTS

CN 1233906 A 11/1999

(Continued)

OTHER PUBLICATIONS

Final Office Action; U.S. Appl. No. 11/155,476; Mailed: Feb. 4, 2010; 10 pages.

(Continued)

*Primary Examiner*—King Y Poon
*Assistant Examiner*—Akwasi M Sarpong
(74) *Attorney, Agent, or Firm*—Perkins Coie LLP

(57) ABSTRACT

A scanning apparatus for transparent documents includes a scanner which includes a host and a lid pivotally coupled with the host, and a transparent document holding module which is located between the host and the lid, and includes a main body and a light guide element which is located on the periphery of the main body. The host has an optical module for scanning. The optical module includes a plurality of lighting units and a first attraction element. The main body aims to hold a transparent document. The light guide element includes a second attraction element attracted to the first attraction element. When the light guide element is moved with the optical module, the direction of light projecting to the transparent document is altered. Thus when the light guide element is moved with the optical module along a track, scanning of images on the transparent documents can also be accomplished.

15 Claims, 5 Drawing Sheets

U.S. PATENT DOCUMENTS

| | | | |
|---|---|---|---|
| 7,525,700 B2 * | 4/2009 | Tseng | 358/487 |
| 2002/0039205 A1 * | 4/2002 | Chang | 358/487 |
| 2003/0117671 A1 * | 6/2003 | Lai | 358/474 |
| 2004/0012824 A1 * | 1/2004 | Haas et al. | 358/474 |
| 2005/0036178 A1 | 2/2005 | Pai | |
| 2005/0146757 A1 | 7/2005 | Haas et al. | |
| 2006/0203303 A1 | 9/2006 | Wei | |

FOREIGN PATENT DOCUMENTS

| | | |
|---|---|---|
| CN | 1338701 A | 3/2002 |
| CN | 2609008 | 3/2004 |
| CN | 1507995 | 6/2004 |
| CN | 1531325 | 9/2004 |
| TW | I220095 | 8/2004 |

OTHER PUBLICATIONS

Interview Summary; U.S. Appl. No. 11/155,476; Mailed: Nov. 10, 2009; 3 pages.

Non-Final Office Action; U.S. Appl. No. 11/155,476; Mailed: Aug. 18, 2009; 7 pages.

Non-Final Office Action; U.S. Appl. No. 11/155,476; Mailed: May 14, 2010; 9 pages.

\* cited by examiner

SCANNING APPARATUS FOR TRANSPARENT DOCUMENTS

FIELD OF THE INVENTION

The invention relates to a scanning apparatus, and particularly to a scanning apparatus for scanning transparent documents and reflective documents.

BACKGROUND OF THE INVENTION

The technique of using a scanning apparatus to scan documents is well-known in the art. Regardless of transparent documents or opaque documents, a light source has to be provided to emit light, which projects to the document and enters into an optical module in the scanning apparatus to perform image scanning. For scanning opaque documents, the light emitted by the light source projects to the document, which reflects the light to the optical module to perform image scanning of the opaque document. For scanning transparent documents, the light emitted from the light source penetrates the document to reach the optical module so as to perform image scanning of the transparent document. Hence, the the conventional dual-purpose scanners for transparent documents and reflective documents mostly have the reflective light source installed in the scanner host, and have the transparent light source installed in the lid of the scanner, but such a design has two independent light sources, and takes a great deal of space. Many elements are needed and the cost is higher.

To remedy the aforesaid problems, scanners that can scan transparent documents and reflective documents through using one light source have been developed. For instance, R.O.C. patent publication No. I220095 discloses a technique that has a lid including a reflective mirror and a light guide plate. Light emitted form a light source passes through two sides of the transparent document and is reflected by the reflective mirror to the light guide plate. The light guide plate directs the light to pass through the transparent document to perform scanning. Such a design can reduce the number of elements and save costs partially. However, it still requires a lot of space.

SUMMARY OF THE INVENTION

In view of the aforesaid problems, the invention is to provide a scanning apparatus for transparent documents that is capable of scanning reflective documents and transparent documents.

The scanning apparatus for transparent documents according to the invention includes a scanner and a transparent document holding module. The scanner includes a host and a lid pivotally coupled to the host. The host includes an optical module for scanning. The optical module has a plurality of lighting units and a first attraction element. The transparent document holding module is located between the host and the lid, and includes a main body and a light guide element which is located on the periphery of the main body. The main body aims to hold a transparent document. The light guide element includes a second attraction element attracted to the first attraction element to alter the direction of light projecting to the transparent document when the light guide element is moved with the optical module. Hence when the light guide element is moved with the optical module along a track, scanning of images on the transparent document is also performed.

Hence the scanning apparatus for transparent documents of the invention can scan both transparent documents and reflective documents. Compared with the conventional techniques that have to install a transparent light source in the lid to scan transparent documents, the invention saves a great deal of space. The light guide element of the invention can reflect the incident light inside without incurring too much energy loss. Hence light emitting diodes may be used as the light source of the lighting units. Moreover, compared with the scanning apparatus that can scan only reflective documents, the invention, by merely adding the lighting units and the light guide element, can perform image scanning of transparent documents as well. Compared with the conventional techniques that have to install the light source in the lid, the invention saves the cost of many elements. Furthermore, by providing the first attraction element and the second attraction element, the optical module can drive the light guide element along the track to perform scanning for the transparent document.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
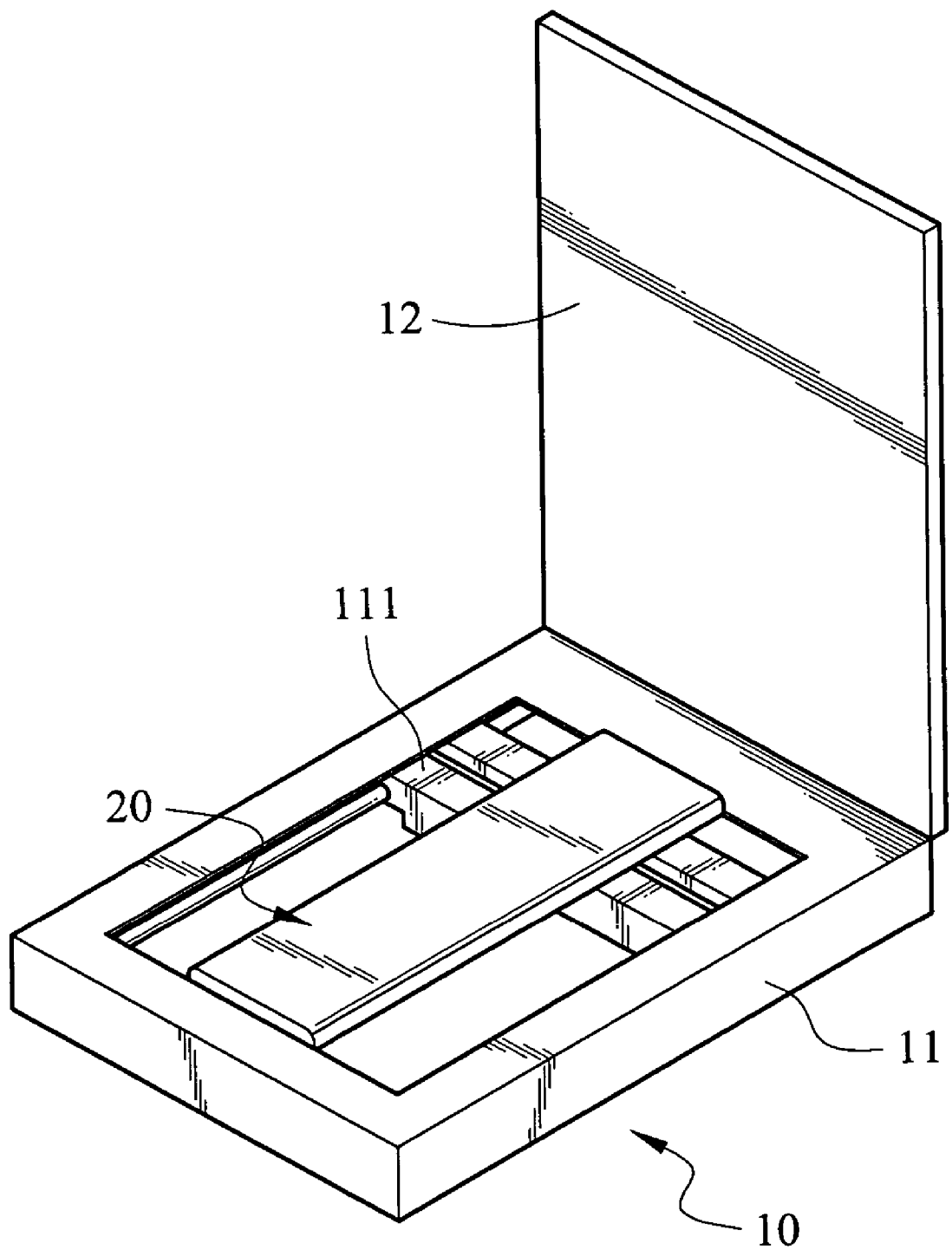
FIG. 1 is a perspective view of a first embodiment of the invention.
Figure 2:
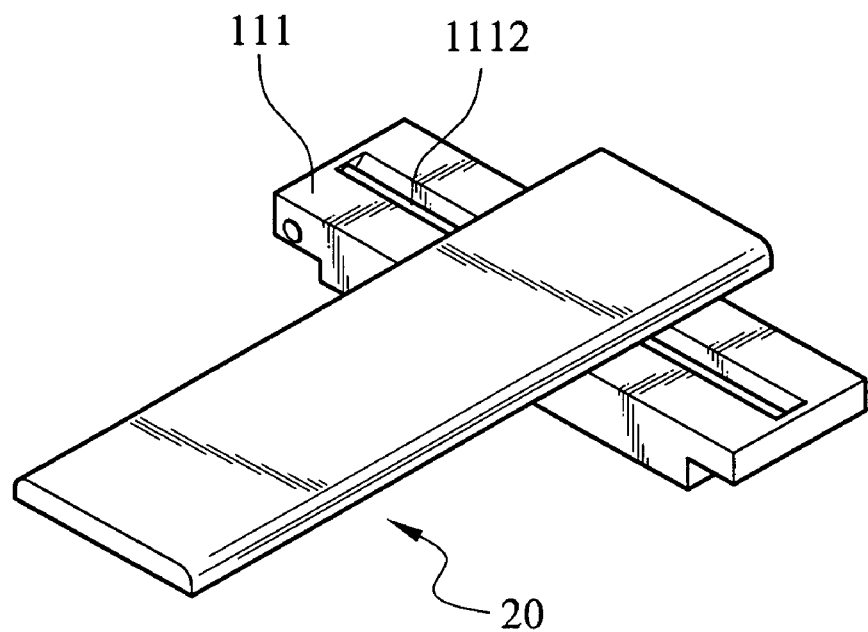
FIG. 2 is a schematic view of the first embodiment of the invention showing the relative positions of the optical module and the transparent document holding module.
Figure 3:
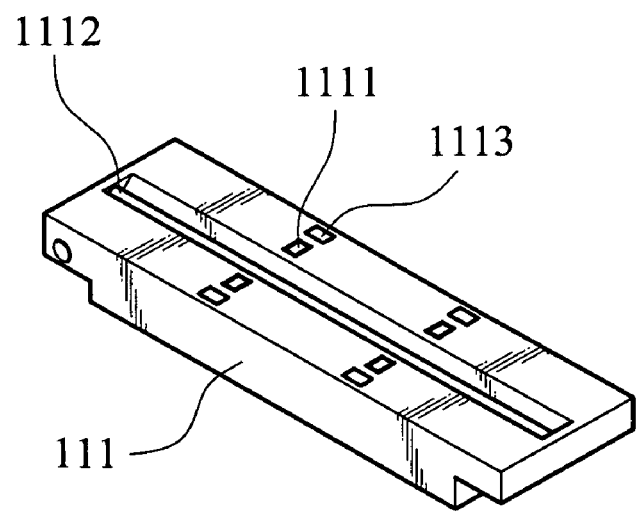
FIG. 3 is a schematic view of the first embodiment of the invention showing the structure of the optical module.
Figure 4:
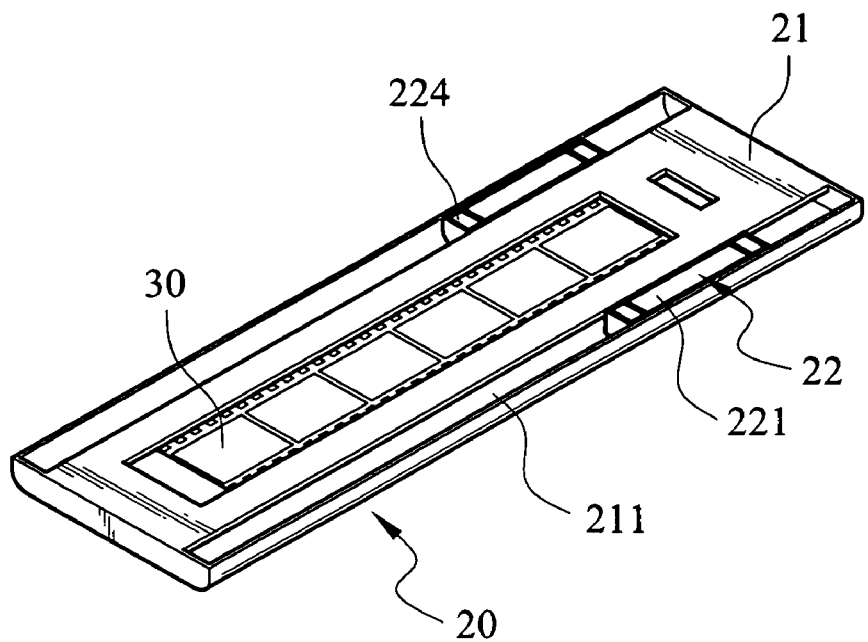
FIG. 4 is a schematic view of the first embodiment of the invention showing the relative positions of the transparent document holding module and the transparent document.
Figure 5:
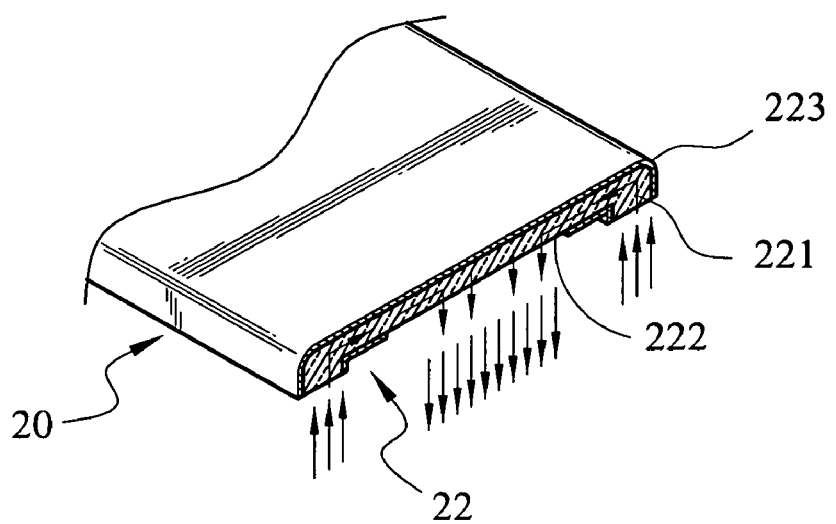
FIG. 5 is a schematic view of the first embodiment of the invention showing the direction of light travel when the light guide element is used.

Refer to FIG. 1 for a first embodiment of the structure of the invention, FIG. 2 for the relative positions of the optical module and the transparent document holding module of the first embodiment, FIG. 3 for the optical module of the first embodiment, FIG. 4 for the relative positions of the transparent document holding module and the transparent document, and FIG. 5 for the direction of light travel when the light guide element is used according to the first embodiment. The scanning apparatus for transparent documents according to the invention includes a scanner 10 and a transparent document holding module 20.

The scanner 10 includes a host 11 and a lid 12 pivotally coupled with the host 11. The host 11 includes an optical module 111 for scanning. The optical module 111 has a plurality of lighting units 1111, a lamp 1112 and a first attraction unit 1113. The lighting units 1111 are light emitting diodes. The first attraction unit 1113 is a magnet or a metal.

The transparent document holding module 20 is located between the host 11 and the lid 12, and includes a main body 21 and a light guide element 22 located on the periphery of the main body 21. The main body 21 aims to hold a transparent document 30 and has a track 211 to allow the light guide element 22 to be movably mounted thereon. The light guide element 22 may be made from polymers such as poly carbonate, acrylic and the like, and includes an incident section 221, an emergent section 222, and a reflective section 223 on the outer surface. The incident section 221 abuts one side of main body 21 corresponding to the lighting units 1111. The emergent section 222 is adjacent to one surface of the main body 21 corresponding to the transparent document 30 to alter the direction of light projecting to the transparent document 30. The surface of the emergent section 222 is not a smooth surface so as to evenly disperse emitting light. The light guide element 22 also has a second attraction element 224 that is attracted to the first attraction element 1113. The second attraction element 224 may be a magnet or a metal corresponding to the first attraction element 1113 so that they are attracted to each other to enable the light guide element 22 to be moved with the track 211 and alter the direction of light projecting to the transparent document 30.

Figure 6:
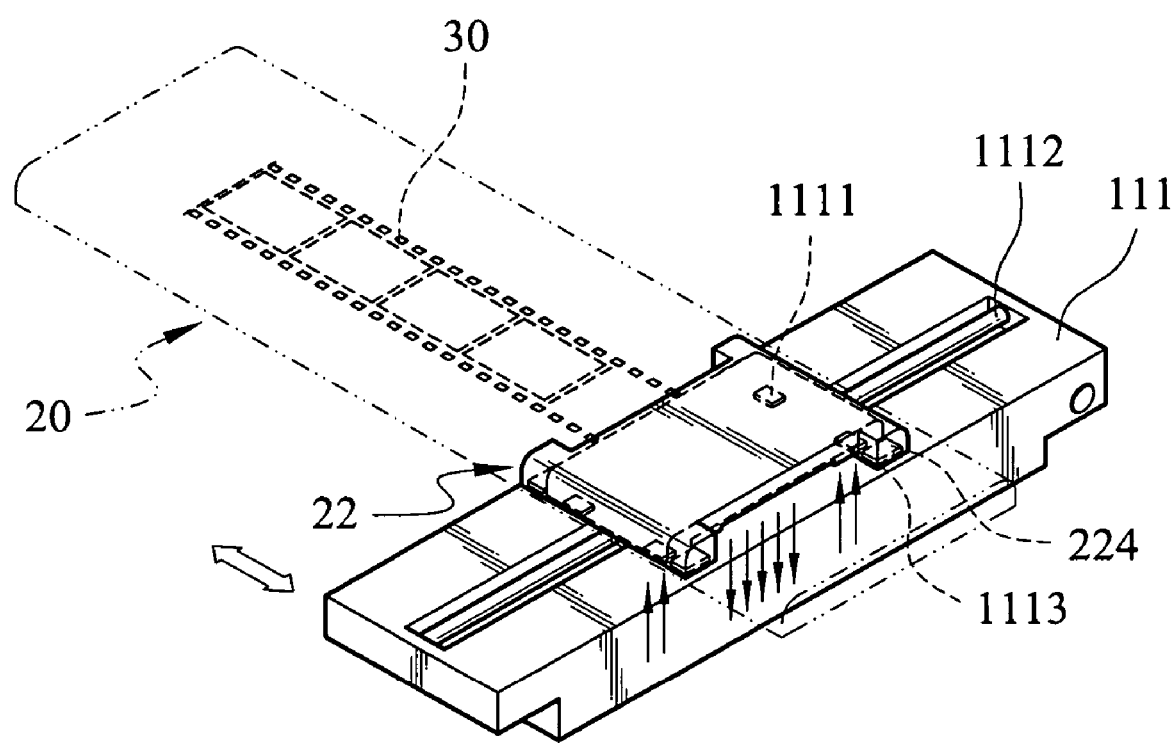
FIG. 6 is a schematic view of the first embodiment of the invention in a usage condition.

Refer to FIG. 6 for the first embodiment in a usage condition. While scanning the transparent document 30, light emitted from the lighting units 1111 projects through the incident section 222 into the light guide element 22, is reflected by the reflection section 223, emits through the emergent section 222, and passes through the transparent document 30 to reach the optical module 111 to scan the images of the transparent document 30. While the optical module 111 is moved, because the first attraction element 1113 and the second attraction element 224 are attracted to each other, the light guiding element 22 is also moved with the optical module 111 along the track 211. While scanning the transparent document 30, the lamp 1112 does not emit light. Hence no light is projected from the host 11 towards the lid 12 to affect image scanning of the transparent document 30. Moreover, even if there is light projecting from the direction of the host 11 towards the lid 12, the light guide element 22 can still direct the light from the lid 12 towards the host 11 to reach the optical module 111 to scan the images of the transparent document 30. Because the light guide element 22 is moved with the optical module 111 along the track 211, scanning of the images on the transparent document 30 can be accomplished. Of course, the invention can also scan reflective documents through the lamp 1112. This is a technique known in the art, thus details are omitted.

The scanning apparatus for transparent documents of the invention can scan both transparent documents 30 and reflective documents. Compared with the conventional techniques that have to install the transparent light source in the lid (not shown in the drawings) to scan the transparent documents, the invention saves a great deal of space. The light guide element 22 of the invention can reflect the incident light inside without incurring too much energy loss. Hence light emitting diodes may be used as the light source of the lighting units 1111. Moreover, compared with the scanning apparatus that can scan only the reflective documents, the invention, by merely adding the lighting units 1111 and the light guide element 22, can perform image scanning of the transparent document 30. Compared with the conventional techniques that have to install the light source in the lid, the invention saves the cost of many elements. In addition, by providing the first attraction element 1113 and the second attraction element 224, the optical module 111 can drive the light guide element 22 along the track 211 to perform scanning for the transparent document 30.

Figure 7:
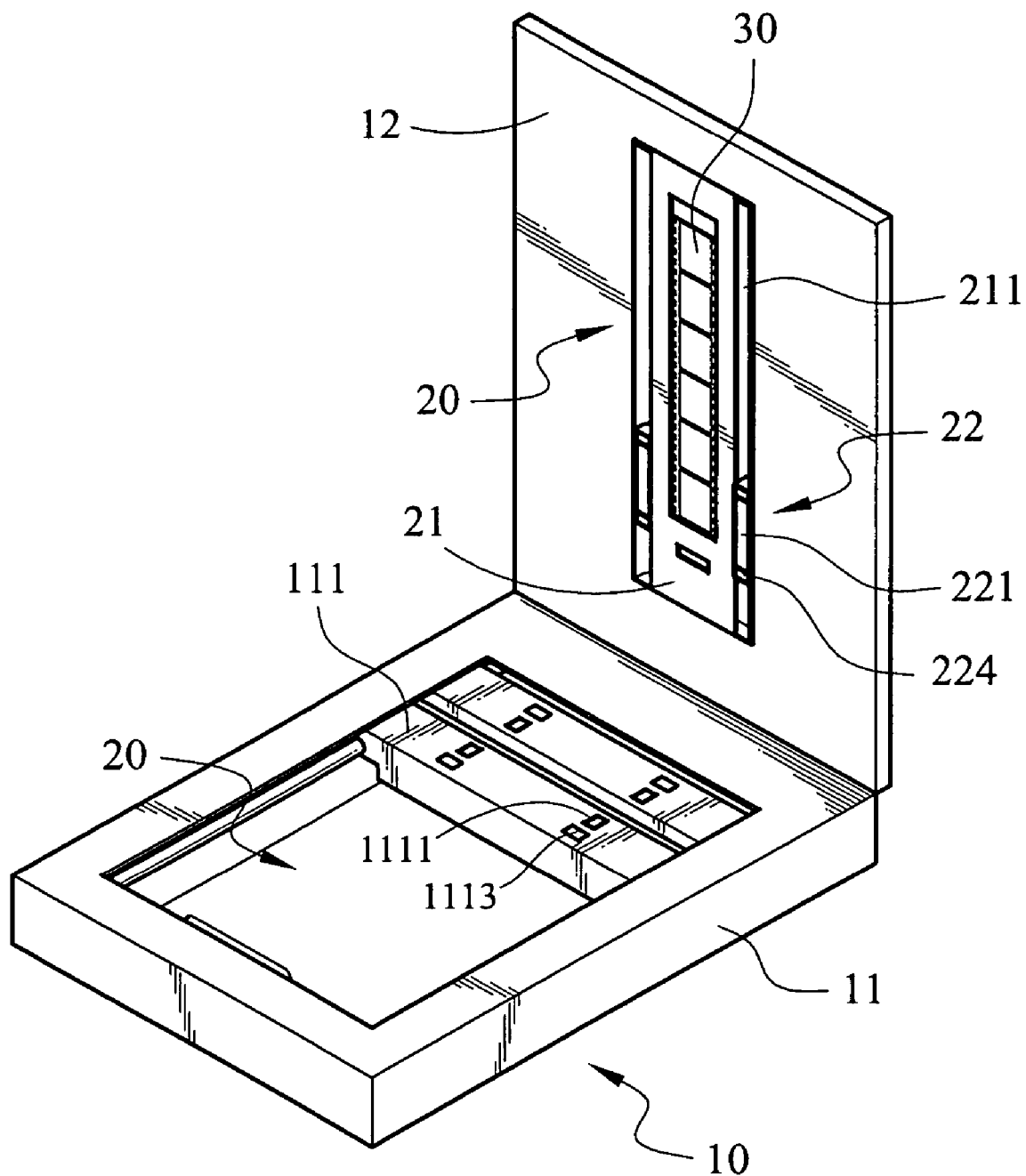
FIG. 7 is a perspective view of a second embodiment of the invention.

In addition to the constructions set forth above, the invention can also be directly coupled with the lid 12. Refer to FIG. 7 for a second embodiment of the invention for such a structure. The transparent document 30 is held in the transparent document holding module 20 when in use. Once the scanner 10 is activated, scanning operation starts. The function of the light guide element 22 is the same as previously discussed.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A scanning apparatus for scanning a transparent document, the scanning apparatus comprising:
   a scanner comprising a lid pivotally coupled to a host, wherein the host comprises an optical module having a lighting unit and a first attraction element, the optical module being movable within the host; and
   a transparent document holding module configured to be positioned between the host and the lid, wherein the transparent document holding module comprises—
   a body configured to hold the transparent document, the body having a first side adjacent to the host and a second side adjacent to the lid; and
   a light guide element movably positioned on the body and configured to direct light from the lighting unit through the transparent document to the optical module, wherein the light guide element comprises a second attraction element at the first side of the body and attracted to the first attraction element such that the optical module moves the light guide element along the body as the optical module moves in the host.

2. The scanning apparatus of claim 1 wherein the lighting unit comprises one or more light emitting diodes.

3. The scanning apparatus of claim 1 wherein the optical module further comprises a lamp, wherein the lamp does not emit light when the lighting unit emits light.

4. The scanning apparatus of claim 1 wherein the light guide element comprises:
   an incident section at the first side of the body, wherein the incident section is generally aligned with the lighting unit of the optical module
   an emergent section at the first side of the body and spaced apart from the incident section, wherein the emergent section is generally aligned with a position of the transparent document; and
   a reflective section between the first and second sides of the body, wherein the reflective section connects the incident section and the emergent section, wherein light emitted from the lighting unit enters the light guide element through the incident section, passes through the light guide element in the reflective section, and exits the light guide element through the emergent section and passes through the transparent document to reach the optical module to scan an image of the transparent document.

5. The scanning apparatus of claim 1 wherein the first attraction element is a magnet and the second attraction element is a metallic member.

6. The scanning apparatus of claim 1 wherein the first attraction element is a metallic member and the second attraction element is a magnet.

7. The scanning apparatus of claim 4 wherein the emergent section comprises a portion of the first side of the body having a non-smooth surface.

8. The scanning apparatus of claim 1 wherein the body further comprises a track configured to guide the light guide element along the body as the light guide element moves along the body.

9. The scanning apparatus of claim 1 wherein the body is made from at least one of a poly carbonate and acrylic.

10. The scanning apparatus of claim 1 wherein the transparent document holding module is carried by the lid.

11. A scanner, comprising:
    a housing;
    a cover movably coupled to the housing;
    an optical module positioned within the housing and movable along a scanning path, wherein the optical module comprises a light source and a first attraction element; and
    a document holder configured to be coupled to at least one of the housing and the cover, wherein the document holder is configured to releasably secure a transparent document between the housing and the cover, and wherein the document holder comprises—
        a body;
        a light guide movably coupled to the body, wherein the light guide has a channel configured to redirect light received from the light source through the body and the transparent document to the light source; and
        a second attraction element carried by the light guide, wherein the first and second attraction elements are attracted to each other to move the light guide with the optical module as the optical module moves along the scanning path.

12. The scanner of claim 11 wherein the body of the document holder further comprises a track, and wherein the light guide moves along the track as the optical module moves along the scanning path.

13. The scanner of claim 11 wherein the channel in the light guide comprises:
    an inlet portion configured to introduce light from the light source into the body of the document holder;
    an outlet portion configured to direct light out of the body of the document holder toward the transparent document; and
    a reflective portion connecting the inlet portion to the outlet portion and configured to direct light through the body of the document holder.

14. The scanner of claim 13 wherein the inlet portion is generally aligned with the light source and the outlet portion is generally aligned with a position of the transparent document.

15. The scanner of claim 11 wherein the document holder is carried by the cover.

\* \* \* \* \*